(12) United States Patent
Kim

(10) Patent No.: US 12,686,375 B2
(45) Date of Patent: Jul. 21, 2026

(54) ELECTRONIC BRAKE SYSTEM, VEHICLE INCLUDING THE SAME, AND METHOD OF OPERATING THE SAME

(71) Applicant: HL MANDO CORPORATION, Pyeongtaek-si (KR)

(72) Inventor: Jin Seok Kim, Suwon-si (KR)

(73) Assignee: HL MANDO CORPORATION, Pyeongtaek-si (KR)

( * ) Notice: Subject to any disclaimer, the term of this patent is extended or adjusted under 35 U.S.C. 154(b) by 675 days.

(21) Appl. No.: 17/973,048

(22) Filed: Oct. 25, 2022

(65) Prior Publication Data
US 2023/0132084 A1 Apr. 27, 2023

(30) Foreign Application Priority Data
Oct. 27, 2021 (KR) ........................ 10-2021-0144891

(51) Int. Cl.
*B60T 13/74* (2006.01)
*B60T 1/06* (2006.01)
(Continued)

(52) U.S. Cl.
CPC ............ *B60T 13/746* (2013.01); *B60T 1/065* (2013.01); *F16D 55/226* (2013.01); *F16D 65/18* (2013.01);
(Continued)

(58) Field of Classification Search
CPC .... F16D 55/226; F16D 65/18; F16D 2125/40; F16D 2127/06; B60T 1/065
See application file for complete search history.

(56) References Cited

U.S. PATENT DOCUMENTS 3,763,968 A * 10/1973 Noly ...................... F16D 59/02
361/210
5,949,168 A * 9/1999 Dieckmann ........... B60T 13/741
188/71.7
(Continued)

FOREIGN PATENT DOCUMENTS

DE 602 06 416 T2 6/2006
DE 10 2006 012 076 A1 9/2007
(Continued)

OTHER PUBLICATIONS

Office Action issued in corresponding Korean Patent Application No. 10-2021-0144891, dated Jun. 29, 2022.
(Continued)

*Primary Examiner* — Nicholas J Lane
(74) *Attorney, Agent, or Firm* — Hauptman Ham, LLP

(57) ABSTRACT
An electronic brake system is disclosed. According to one aspect of the present disclosure, there may be provided an electronic brake system including a piston provided in a caliper housing to press a pad plate, a nut coupled to the inside of the piston to move the piston forward or backward, a spindle configured to move the nut forward or backward by rotation and including a stepped portion formed on an outer surface thereof, a rotation limit unit connected to or disconnected from the spindle to allow or block the rotation of the spindle, and a drive unit configured to move the rotation limit unit to a position at which the rotation of the spindle is allowed or blocked, wherein the rotation limit unit includes a body surrounding an outer circumferential surface of the spindle, a binder provided on the body and provided to come into close contact with the stepped portion, and a connector provided on the body and configured to receive a driving force from the drive unit.

17 Claims, 5 Drawing Sheets

(51) Int. Cl.

| | |
|---|---|
| *F16D 55/226* | (2006.01) |
| *F16D 65/18* | (2006.01) |
| *F16D 121/24* | (2012.01) |
| *F16D 125/40* | (2012.01) |
| *F16D 125/52* | (2012.01) |
| *F16D 127/06* | (2012.01) |

(52) U.S. Cl.
CPC ...... *F16D 2121/24* (2013.01); *F16D 2125/40* (2013.01); *F16D 2125/52* (2013.01); *F16D 2127/06* (2013.01)

(56) References Cited

U.S. PATENT DOCUMENTS

| | | | | |
|---|---|---|---|---|
| 6,213,256 | B1 * | 4/2001 | Schaffer | F16D 65/18 |
| | | | | 188/71.9 |
| 6,315,092 | B1 * | 11/2001 | Schwarz | B60T 13/741 |
| | | | | 188/71.9 |
| 6,340,077 | B1 * | 1/2002 | Schaffer | B60T 13/741 |
| | | | | 188/71.7 |
| 6,561,321 | B1 * | 5/2003 | Klode | F16D 65/18 |
| | | | | 188/72.1 |
| 10,001,182 | B2 * | 6/2018 | Zhang | F16D 65/16 |
| 2002/0092711 | A1 * | 7/2002 | Drennen | F16D 65/18 |
| | | | | 188/71.2 |
| 2006/0032712 | A1 * | 2/2006 | Kollaard | F16D 65/18 |
| | | | | 188/72.8 |

| | | | | |
|---|---|---|---|---|
| 2014/0000992 | A1 * | 1/2014 | Tajima | B60T 1/005 |
| | | | | 188/72.1 |
| 2014/0069751 | A1 * | 3/2014 | Park | F16D 65/18 |
| | | | | 188/72.4 |
| 2015/0266568 | A1 * | 9/2015 | Evenor | F16D 65/12 |
| | | | | 188/162 |
| 2017/0058979 | A1 * | 3/2017 | Bahmata | F16D 55/226 |
| 2022/0024426 | A1 * | 1/2022 | Baek | F16D 65/18 |
| 2023/0286484 | A1 * | 9/2023 | Shin | F16D 65/18 |

FOREIGN PATENT DOCUMENTS

| | | |
|---|---|---|
| DE | 11 2012 001 273 T5 | 12/2013 |
| DE | 10 2019 207 209 A1 | 11/2019 |
| JP | 2012-193805 A | 10/2012 |
| KR | 10-2011-0057764 A | 6/2011 |
| KR | 10-2011-0072876 A | 6/2011 |
| KR | 10-2011-0072877 A | 6/2011 |
| KR | 10-2013-0117091 A | 10/2013 |
| KR | 10-1511437 B1 | 4/2015 |
| KR | 10-2018-0125240 A | 11/2018 |
| KR | 10-2019-0055311 A | 5/2019 |
| KR | 10-2020-0142207 A | 12/2020 |

OTHER PUBLICATIONS

Office Action issued on Jun. 20, 2025 for corresponding German Patent Application No. 10 2022 211 114.1, along with an English machine translation (21 pages).

* cited by examiner

1

ELECTRONIC BRAKE SYSTEM, VEHICLE INCLUDING THE SAME, AND METHOD OF OPERATING THE SAME

CROSS-REFERENCE TO RELATED APPLICATION

This application is based on and claims priority under 35 U.S.C. § 119 to Korean Patent Application No. 10-2021-0144891, filed on Oct. 27, 2021, in the Korean Intellectual Property Office, the disclosure of which is incorporated herein by reference.

BACKGROUND

1. Field

The present disclosure relates to an electronic brake system, and more specifically, to an electronic brake system which stably maintains a parking brake state while a parking brake operates, a vehicle including the same, and a method of operating the same.

2. Description of the Related Art

A brake system for performing braking is necessarily mounted on a vehicle, and the brake system requires a parking brake function for maintaining a stopped state of the vehicle when parked in addition to a service brake function for providing a braking force in a traveling situation of the vehicle.

In conventional parking brakes, a foot brake driven by a foot stepping on a pedal and a hand brake type driven by a hand pulling a lever have been mainly used, but there is a problem in that one hand needs a high force to pull and operate a lever of the parking brake and particularly cause back injuries and a strain on the arm of a driver who frequently parks and stops a vehicle. In addition, since the lever of the parking brake is positioned at the center of a console, the use of an indoor space is limited.

Therefore, recently, a method of implementing electro-mechanical parking brake using an actuator to generate a braking force using a motor by receiving a driver's intention for parking brake as an electric signal in a method of pressing a button has been developed.

An electro-mechanical brake (EMB) system configured to generate a braking force using an electronically controlled motor as a power source may have a simpler configuration than that of a hydraulic brake because it does not generate the braking force using hydraulic pressure and may optimally implement integrated chassis control together with various electronic control devices.

While performing parking brake of the vehicle, a parking unit such as a piston and a nut-spindle of a caliper brake and a parking brake shoe of a drum brake maintains a braking force.

However, even when the parking unit maintains the parking brake force, the parking brake state of the vehicle is released when there is a cause which hinders the maintenance of the parking brake, such as receiving an external impact or having to park the vehicle on a slope, and thus the vehicle may move. Alternatively, when power of the electronic brake system is cut off, since a frictional force between a pad and a disk is lowered, the parking brake state of the vehicle is released and thus the parked vehicle may move.

Therefore, in order to prevent the movement of the vehicle even in the parking brake state, stones or braces are placed between wheels or behind the wheels, but this problem has not been directly solved in the conventional parking brakes, and thus the necessity of solving this has been required.

RELATED ART DOCUMENT

Patent Document (Patent Document 1) Korean Patent Application Laid-Open No. 10-2011-0057764 (Jun. 1, 2011)

SUMMARY

An embodiment of the present disclosure is directed to providing an electronic brake system which may generate a braking force by a rotation limit unit that limits the rotation of a spindle and a vehicle including the same.

An embodiment of the present disclosure is also directed to providing an electronic brake system which may distribute a rotational force of a spindle applied to a rotation limit unit to a caliper housing through a supporter provided in the caliper housing so that the rotational force of the spindle is prevented from being concentrated to a drive unit and a vehicle including the same.

An embodiment of the present disclosure is also directed to providing an electronic brake system which may generate a braking force by providing an actuator configured to transmit power to a spindle and a separate drive unit and bringing a rotation limit unit into close contact with the spindle and a vehicle including the same.

An embodiment of the present disclosure is also directed to providing an electronic brake system which may decrease current consumption and improve braking reliability and a vehicle including the same.

According to one aspect of an embodiment of the present disclosure, there is provided an electronic brake system including a piston provided in a caliper housing to press a pad plate, a nut configured to move the piston forward or backward, a spindle configured to move the nut forward or backward by rotation and including a stepped portion formed on an outer surface thereof, a rotation limit unit connected to or disconnected from the spindle to allow or block the rotation of the spindle, and a drive unit configured to move the rotation limit unit to a position at which the rotation of the spindle is allowed or blocked, wherein the rotation limit unit includes a body surrounding an outer circumferential surface of the spindle and a binder provided on the body to come into close contact with or be separated from the stepped portion.

Any one of the stepped portion and the binder may include at least one first protrusion, and the other of the stepped portion and the binder may include a first groove connected to the first protrusion.

The first groove may be formed to be recessed in an axial direction of the spindle.

The caliper housing may include a supporter surrounding an outer circumferential surface of the body.

The supporter may include a second groove formed to be recessed in an axial direction of the spindle, and the body may include a second protrusion formed to protrude from a position corresponding to the second groove.

According to another aspect of the embodiment of the present disclosure, there is provided an electronic brake system including a piston provided in a caliper housing to press a pad plate, a nut configured to move the piston forward or backward, a spindle configured to move the nut forward or backward by rotation and including a first groove formed to be recessed in an outer surface thereof, a rotation limit unit including a first protrusion formed to protrude from a position corresponding to the first groove to allow or block the rotation of the spindle and fixedly inserted into the first groove, and a drive unit configured to move the rotation limit unit forward or backward to a position at which the rotation of the spindle is allowed or blocked.

The spindle may include a stepped portion including the first groove and provided on an outer surface of the spindle, and the rotation limit unit may include a body surrounding an outer circumferential surface of the spindle and a binder including the first protrusion and provided on the body to come into close contact with or be separated from the stepped portion.

The first groove may be formed to be recessed in an axial direction of the spindle.

The drive unit may include a motor configured to generate power and a reduction gear connected to a rotational shaft of the motor to transmit a driving force to the rotation limit unit.

The rotation limit unit may further include a connector provided on the body and configured to receive the driving force from the drive unit.

The reduction gear may include a worm connected to the rotational shaft of the motor and a worm gear having an outer side connected to the worm and an inner side connected to the connector.

The connector may be connected to the worm gear to receive the driving force of the motor and may rotate about the axial direction of the spindle.

The connector may have a first screw thread formed on an outer circumferential surface thereof, and the worm gear may have a second screw thread engaged with the first screw thread formed at a position corresponding to the first screw thread.

The caliper housing may include an elastic member configured to elastically support the worm gear.

The nut may have a hollow in a longitudinal direction and a first screw thread, which is screw-coupled to a second screw thread formed on the spindle in a certain section in a longitudinal direction, formed on an inner circumferential surface of the hollow.

The spindle may include a spindle body, a spindle flange formed to extend radially from the spindle body and formed with the stepped portion, and a spindle rod having the second screw thread formed on an outer circumferential surface thereof.

The stepped portion may be formed to extend radially from the outer circumferential surface of the spindle.

The body may surround the spindle body connected to an actuator after passing through a cylinder provided in the caliper housing.

According to still another aspect of the embodiment of the present disclosure, there is provided a vehicle including the electronic brake system.

According to yet another aspect of the embodiment of the present disclosure, there is provided a method of operating an electronic brake system, which includes, in a parking mode, transmitting, by an actuator, a driving force to a spindle so that a nut presses a piston, transmitting, by a drive unit, the driving force to a rotation limit unit and bringing a binder into close contact with a stepped portion, and upon releasing the parking mode, separating the binder from the stepped portion and releasing a state in which the nut presses the piston.

In the bringing of the binder into close contact with the stepped portion, a first protrusion formed on a body may be inserted into a first groove formed in the binder, and in the separating of the binder from the stepped portion, the first protrusion may be released from the first groove.

In the bringing of the binder into close contact with the stepped portion, a second protrusion formed on a body may be inserted into a second groove formed in a supporter to prevent rotation of the body, and in the separating of the binder from the stepped portion, the second protrusion may be released from the second groove.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Hereinafter, embodiments of the present disclosure will be described in detail with reference to the accompanying drawings. The following embodiment is presented to sufficiently convey the spirit of the present disclosure to those skilled in the art to which the present disclosure pertains. The present disclosure is not limited to only the embodiment presented herein and may also be specified in other forms. Portions irrelevant to the description will be omitted from the drawings in order to clarify the present disclosure, and the sizes of the components may be described to be slightly exaggerated to help understanding.

Figure 1:
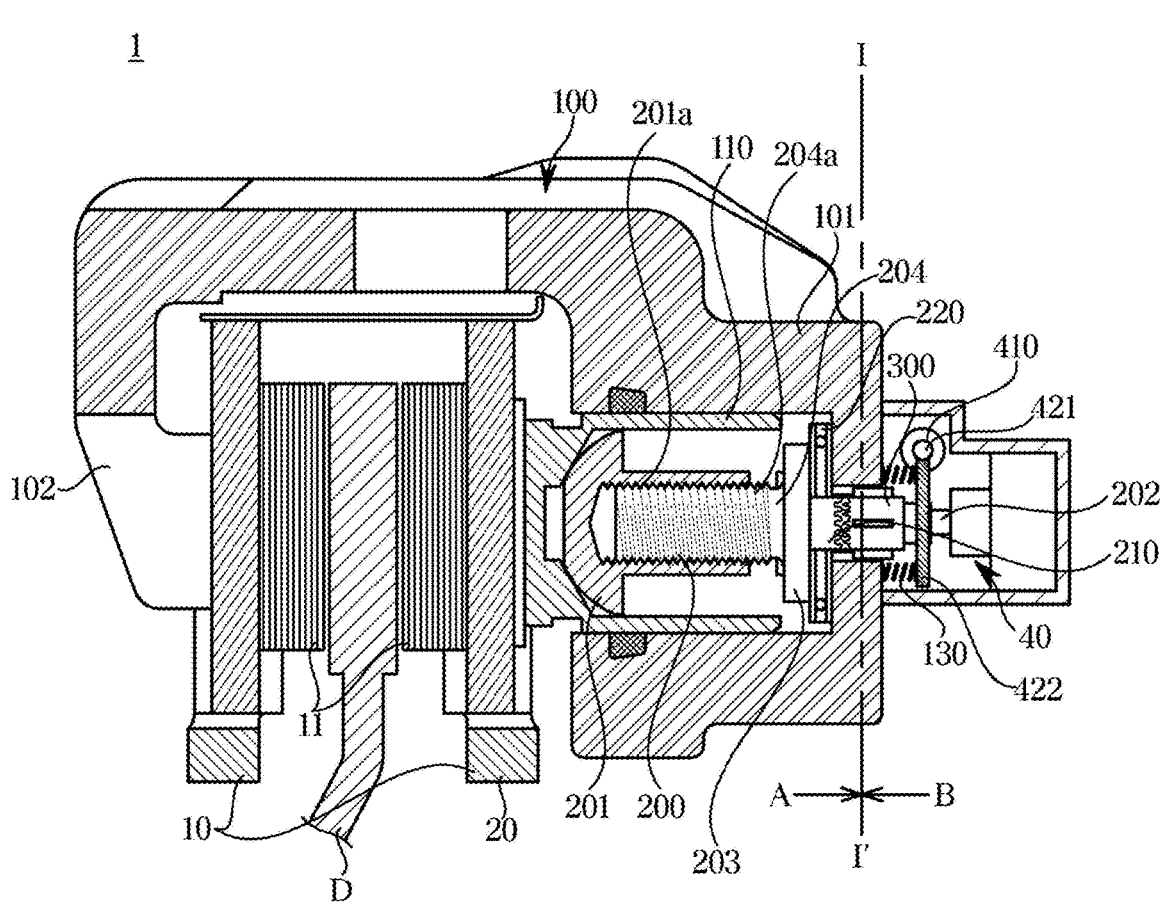
FIG. 1 is a plan view showing an electronic brake system according to one embodiment of the present disclosure.
Figure 2:
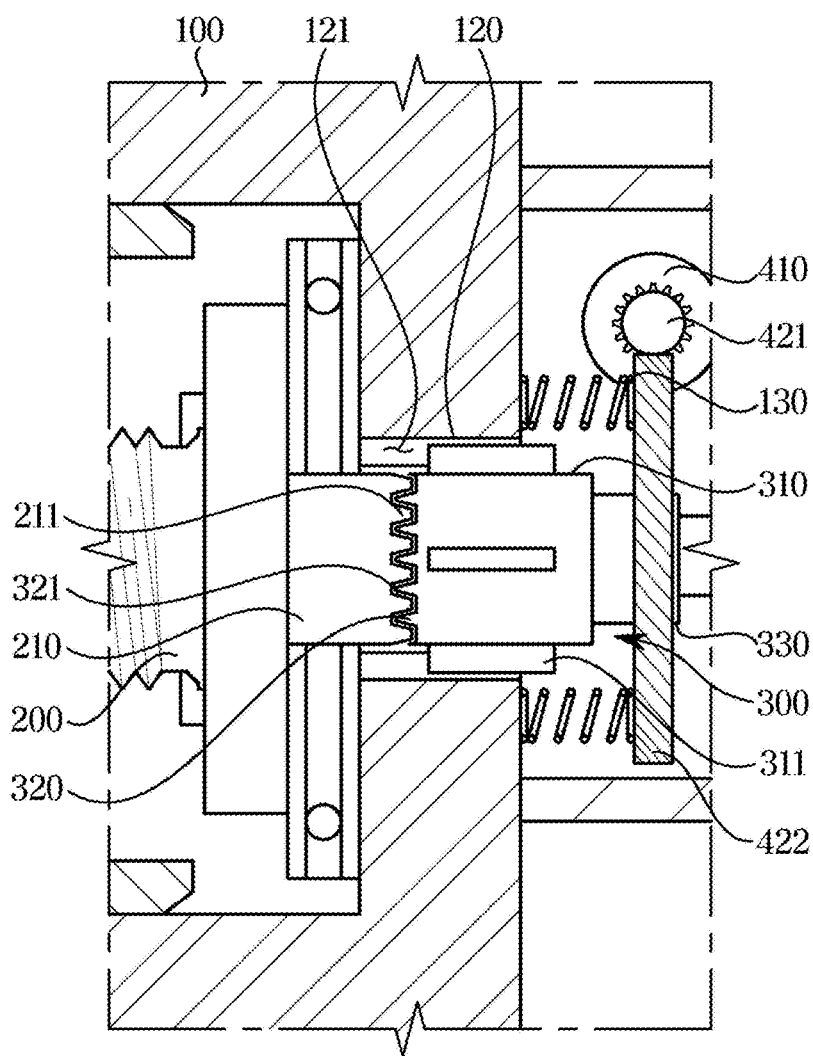
FIG. 2 is an enlarged view showing a state in which a spindle and a rotation limit unit of the electronic brake system according to one embodiment of the present disclosure come into close contact with each other.
Figure 3:
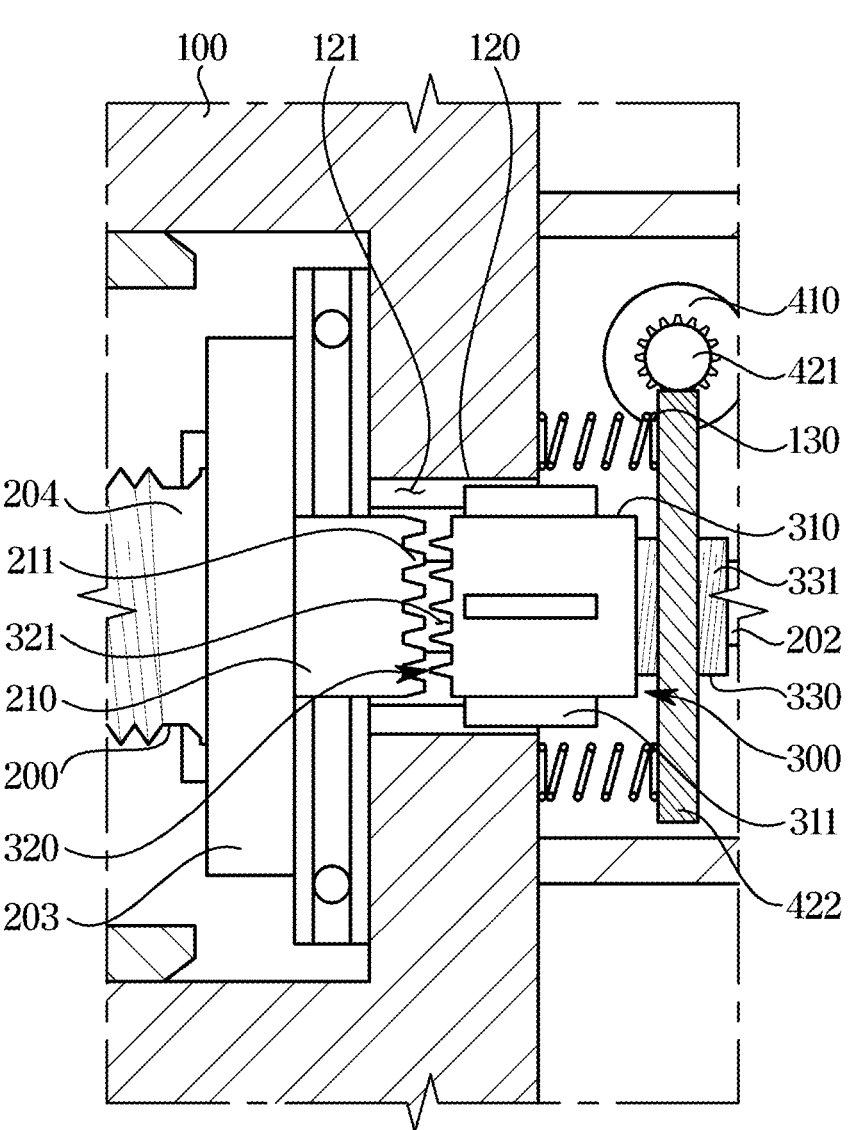
FIG. 3 is an enlarged view showing a state in which the spindle and the rotation limit unit of the electronic brake system according to one embodiment of the present disclosure are separated from each other.
Figure 4:
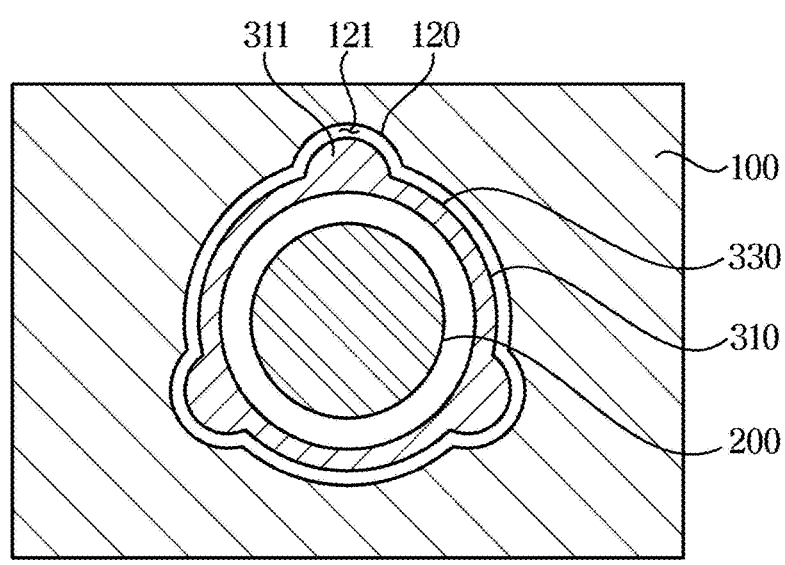
FIG. 4 is a cross-sectional view along line I-I' in FIG. 1 viewed in a direction A.
Figure 5:
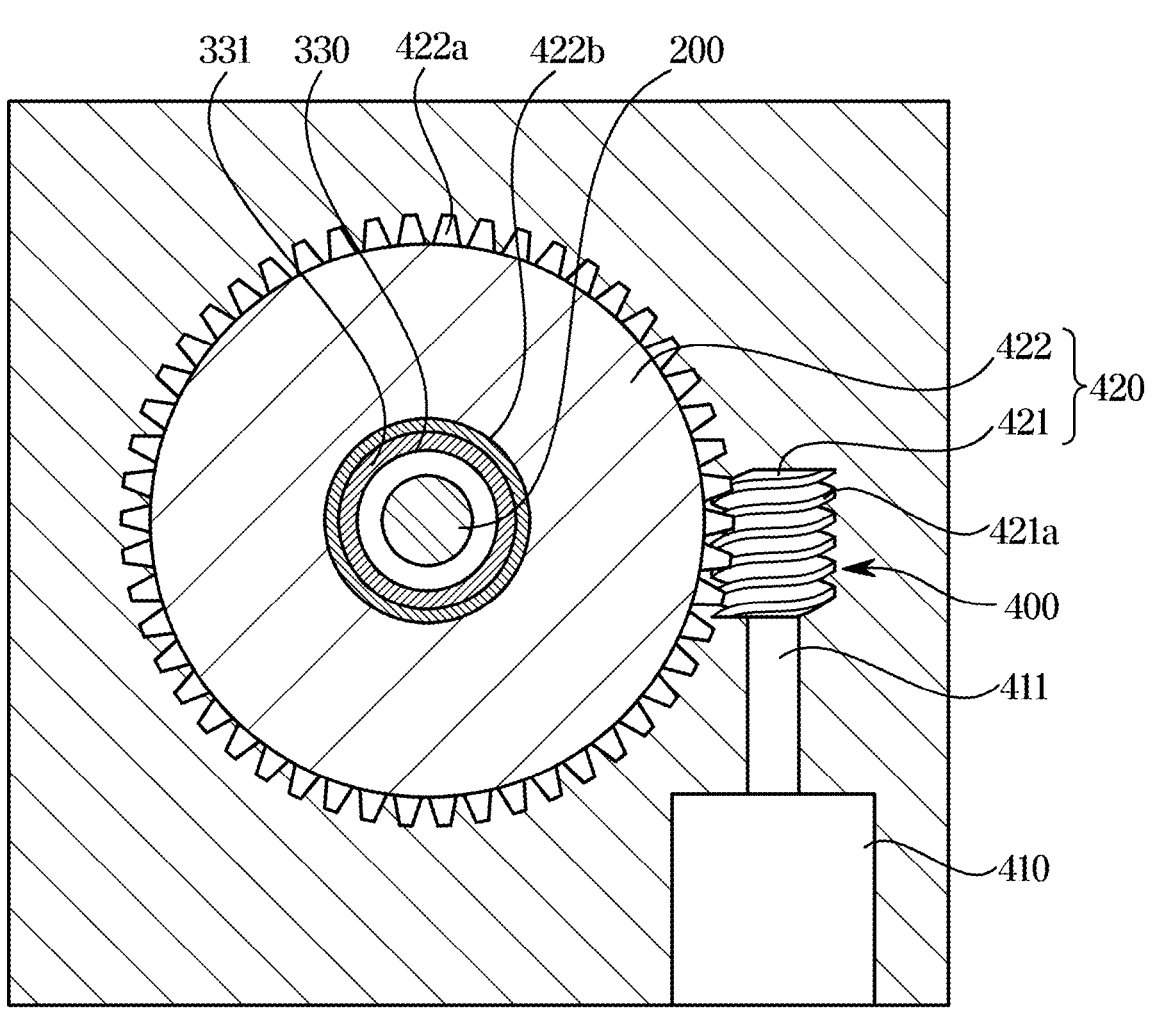
FIG. 5 is a cross-sectional view along line I-I' in FIG. 1 viewed in a direction B.

FIG. 1 is a plan view showing an electronic brake system according to one embodiment of the present disclosure, FIG. 2 is an enlarged view showing a state in which a spindle and a rotation limit unit of the electronic brake system according to one embodiment of the present disclosure come into close contact with each other, FIG. 3 is an enlarged view showing a state in which the spindle and the rotation limit unit of the electronic brake system according to one embodiment of the present disclosure are separated from each other, FIG. 4 is a cross-sectional view along line I-I' in FIG. 1 viewed in a direction A, and FIG. 5 is a cross-sectional view along line I-I' in FIG. 1 viewed in a direction B.

Referring to FIGS. 1 to 5, the electronic brake system according to one embodiment of the present disclosure may include a piston 110 provided in a caliper housing 100 to press a pad plate 10, a nut 201 coupled to the inside of the piston 110 to move the piston 110 forward or backward, a spindle 200 configured to move the nut 201 forward or backward by rotation and including a stepped portion 210 formed on an outer surface thereof, a rotation limit unit 300 connected to or disconnected from the spindle 200 to allow or block the rotation of the spindle 200, and a drive unit 400 configured to move the rotation limit unit 300 to a position at which the rotation of the spindle 200 is allowed or blocked.

A pair of pad plates 10 includes an inner pad plate arranged to come into contact with the piston 110 and an outer pad plate arranged to come into contact with a finger portion 102 of the caliper housing 100. The pair of pad plates 10 may be installed on a carrier 50 fixed to a vehicle body to move forward to or backward from both side surfaces of a disk D. A friction pad 11 may be provided to be attached to one surface of each pad plate 10 facing the disk D.

The caliper housing 100 is slidably installed on the carrier 50. The caliper housing 100 may include a cylinder 101 in which the piston 110 is accommodated to move forward or backward. A power conversion unit may be installed behind the cylinder 101 (right side based on FIG. 1), and the finger portion 102 formed to be bent forward (left side based on FIG. 1) to operate the outer pad plate may be provided. The cylinder 101 and the finger portion 102 may be integrally formed.

The caliper housing 100 may include a supporter 120 surrounding an outer circumferential surface of a body 310 of the rotation limit unit 300. The supporter 120 may include a second groove 121 recessed in a longitudinal direction along an inner circumferential surface thereof. In addition, the caliper housing 100 may include an elastic member 130 configured to elastically support a worm gear 422.

The piston 110 may be formed in a hollow shape with an empty inside and provided to be slid in the cylinder 101. Specifically, the piston 110 may be provided in the shape of a hollow cup to come into contact with the nut 201. The movement of the piston 110 may be converted into a translational motion by the power conversion unit receiving power from an actuator 40 so that the piston 110 moves forward or backward, and therefore, the piston 110 may press the inner pad plate toward the disk D to implement braking. In addition, when the piston 110 moves toward the inner pad plate and presses the inner pad plate, the caliper housing 100 operates in a direction opposite to the piston 110 by a reaction force thereof, and therefore, the finger portion 102 may press the outer pad plate toward the disk D to implement braking.

The power conversion unit is provided to receive power from the actuator 40 including a motor and a reducer to convert a rotational motion into the translational motion and press the piston 110 toward the inner pad plate. The power conversion unit includes the nut 201 disposed inside the piston 110 and coming into contact with an inner rear surface of the piston 110 and the spindle 200 screw-coupled with the nut 201.

The nut 201 is provided to be screw-coupled with the spindle 200 to move forward or backward and come into contact with the piston 110 to limit rotation. The nut 201 functions to move forward or backward according to a rotational direction of the spindle 200 and press or release the piston 110. The nut 201 has a hollow hollowed in the longitudinal direction, and a first screw portion 201a screw-coupled with a second screw portion 204a of the spindle 200 in a certain section in the longitudinal direction is provided on an inner circumferential surface of the hollow.

The spindle 200 has one side that is formed with the second screw portion 204a and screw-coupled with the first screw portion 201a of the nut 201, and the other side that is connected to the actuator 40 and receives the rotational force of the motor in the actuator 40. The spindle 200 may be rotated by receiving the rotational force of the motor and may move the nut 201 forward or backward through the second screw portion 204a screw-coupled with the first screw portion 201a. According to the rotational direction of the spindle 200 by the motor, the nut 201 may move forward or backward and press or release the piston 110.

Specifically, the spindle 200 may include a spindle body 202, a spindle flange 203 formed to extend from the spindle body 202 in a radial direction, and a spindle rod 204 having the second screw portion 204a formed on an outer circumferential surface thereof. The spindle body 202 may be connected to the actuator 40 after passing through the cylinder 101 of the caliper housing 100 to receive the rotational force of the motor, and the spindle flange 203 and the spindle rod 204 may be disposed inside the piston 110. By providing a bearing 220 between the spindle flange 203 and the cylinder 101, the spindle 200 may be stably rotatably supported in the cylinder 101.

The stepped portion 210 may be formed on the outer surface of the spindle 200 and formed to extend radially from the outer surface of the spindle 200. The stepped portion 210 may be formed at a position corresponding to a binder 320 of the rotation limit unit 300. The rotation of the spindle 200 may be limited by bringing the binder 320 of the rotation limit unit 300 into close contact with the stepped portion 210. A braking state of the vehicle is a state in which the nut 201 is pressing the piston 110, and can prevent the release of the pressing state of the piston 110 by the nut 201 by bringing the binder 320 into contact with the stepped portion 210 to limit the rotation of the spindle 200. Therefore, it is possible to improve braking reliability. The stepped portion 210 may be formed to extend radially from the outer circumferential surface of the spindle 200 and specifically may be provided to extend radially from the outer circumferential surface of the spindle body 202.

The stepped portion 210 may include a first protrusion 211 formed to protrude. The first protrusion 211 may be formed on a surface facing the binder 320. The first protrusion 211 may be inserted into a first groove 321 formed in the binder 320, and in the inserted state, the first protrusion 211 may be caught by both side ends of the first groove 321 to limit the rotation of the spindle 200. The positions of the first protrusion and the first groove are not limited thereto, and conversely, the first groove may be formed in the stepped portion 210, and the first protrusion may be formed on the binder 320. In other words, any one of the stepped portion 210 and the binder 320 may include at least one first protrusion, and the other may include the first groove connected to the first protrusion. The first protrusion may be formed to protrude in an axial direction of the spindle, and the first groove may be formed to be recessed in the axial direction of the spindle 200.

The first protrusion 211 and the first groove 321 may be provided in a ratchet shape and provided to allow unidirectional rotation of the spindle 200 and limit the rotation in a direction opposite to the unidirectional rotation when the first protrusion 211 is inserted into the first groove 321. When the rotation limit unit 300 and the spindle 200 are connected, only the unidirectional rotation of the spindle 200 may be allowed to prevent the movement of the nut 201 without being fixed due to the rotation of the spindle 200 in the opposite direction. Therefore, it is possible to improve the reliability of the restraint for the spindle 200 of the rotation limit unit 300.

For example, in the state in which the rotation limit unit 300 comes into close contact with the spindle 200 and the first protrusion 211 is inserted into the rotation limit unit 300, the spindle 200 may not rotate in the opposite direction, and thus it is possible to maintain the state in which the nut 201 presses the piston 110. Conversely, when the rotation limit unit 300 is separated from the spindle 200 and the first protrusion 211 comes out of the first groove 321, the spindle 200 may rotate in the opposite direction, and thus it is possible to release the state in which the nut 201 presses the piston 110.

The rotation limit unit 300 may be connected to the spindle 200 to limit the rotation of the spindle 200. The rotation limit unit 300 may be provided behind the power conversion unit. The rotation limit unit 300 may include a body 310 surrounding the outer circumferential surface of the spindle 200, the binder 320 provided on one side of the body 310 to come into close contact with the stepped portion 210 of the spindle 200, and a connector 330 that is provided on the other side of the body 310 and interlocks with the drive unit 400.

The body 310 is provided between the caliper housing 100 and the spindle 200 and provided to surround the outer circumferential surface of the spindle 200. The body 310 in the caliper housing 100 may be provided to surround the outer circumferential surface of the spindle 200 and thus a separate space for the rotation limit unit 300 does not have to be provided. Therefore, it is possible to improve space utilization in the caliper housing 100. Specifically, the body 310 may surround the spindle body 202 connected to the actuator 40 after passing through the cylinder 101 of the caliper housing 100.

Since the body 310 may move forward or backward in the supporter 120 surrounding the rotation limit unit 300, the body 310 may not deviate from a path of the rotation limit unit 300 in the supporter 120 and may come into close contact with or be separated from the spindle 200.

The body 310 may include a second protrusion 311 formed to protrude along the outer circumferential surface at the position corresponding to the second groove 121 formed to be recessed along the inner circumferential surface of the supporter 120. When the body 310 of the rotation limit unit 300 moves into the supporter 120, the second protrusion 311 is inserted into the second groove 121. When the second protrusion 311 is inserted into the second groove 121 and the body 310 is to be rotated, the second protrusion 311 may be caught by both side ends of the second groove 121, thereby preventing the body 310 from being rotated. Therefore, when the binder 320 comes into close contact with the stepped portion 210 and the first protrusion 211 is inserted into the first groove 321, the body 310, the binder 320, and the stepped portion 210 can be prevented from being rotated together, and thus it is possible to fix the position of the nut 201 by preventing the rotation of the spindle 200. Therefore, it is possible to improve braking reliability.

In addition, when the spindle 200 is restricted by the rotation limit unit 300, the rotational force of the spindle 200 is transmitted to the supporter 120 through the second protrusion 311 and the second groove 121, and the caliper housing 100 supports the rotational force. Since it is possible to prevent the rotational force of the spindle 200 from being concentrated to the drive unit 400, it is not necessary to design the caliper housing 100 on the side where the drive unit 400 is installed to have high stiffness, and it is possible to increase the durability of the drive unit 400. Therefore, design and cost advantages can be obtained.

The binder 320 is provided on the body 310 and comes into close contact with the stepped portion 210 of the spindle 200. The binder 320 may come into close contact with the stepped portion 210 to limit the rotation of the spindle 200. In order to improve the reliability of the restraint for the spindle 200 of the rotation limit unit 300, the binder 320 may include the first groove 321 formed to be recessed in the outer surface thereof, and the first groove 321 may be formed in the surface facing the stepped portion 210. The first protrusion 211 formed on the stepped portion 210 may be inserted into the first groove 321, and the rotation of the spindle 200 may be limited in the inserted and connected state. Conversely, the first groove 321 may be formed in the stepped portion 210 and the first protrusion 211 may be formed on the binder 320 so that a connecting structure may also be provided. It is possible to improve the reliability of the restraint for the spindle 200 of the rotation limit unit 300 by providing the first protrusion 211 and the first groove 321 in the ratchet shape. The first protrusion 211 may be formed to protrude in the axial direction of the spindle 200, and the first groove 321 may be formed to be recessed in the axial direction of the spindle 200.

The connector 330 may be provided on the body 310 and may receive a driving force from the drive unit 400. Specifically, the connector 330 may be interlocked with the worm gear 422 of the motor to receive the driving force of the motor and may rotate around the axial direction of the spindle 200. The connector 330 may rotate and the rotation limit unit 300 may move in the axial direction of the spindle 200. Therefore, the binder 320 may come into close contact with or be separated from the stepped portion 210.

The connector 330 may have a first screw thread 331 provided on an outer circumferential surface thereof. The first screw thread 331 may be engaged with a second screw thread 422*b* provided on an inner circumferential surface of the worm gear 422, and the driving force transmitted from the motor 410 to the worm gear 422 through a worm 421 may be transmitted to the connector 330. In addition, the first screw thread 331 of the connector 330 and the second screw thread 422*b* of the worm gear 422 may be engaged with each other, and thus a self-locking structure in which the positions of the worm 421 and the connector 330 are fixed even when the driving force of the motor is not transmitted from the worm 421 to the worm gear 422 may be formed. Therefore, it is possible to improve a restricting force of the rotation limit unit 300 with respect to the spindle 200 by supporting the rotation limit unit 300 with a large force.

The drive unit 400 may include the motor 410 configured to generate power and a reduction gear 420 connected to a rotational shaft 411 of the motor 410 to transmit the driving force to the rotation limit unit 300.

The motor 410 may receive power by operating a switch provided on the driver seat of the vehicle and convert electrical energy into mechanical rotational kinetic energy. The control of the parking mode according to an operation signal of the switch may be performed by an electronic control unit (ECU) of the vehicle.

The reduction gear 420 may include the worm 421 connected to the rotational shaft 411 of the motor 410 and the worm gear 422 having an outer side connected to the worm 421 and an inner side connected to the connector 330 of the rotation limit unit 300. The driving force of the motor 410 may be transmitted to the rotation limit unit 300 through the reduction gear 420 to limit the rotation of the spindle 200.

The worm 421 rotates about the rotational shaft 411 of the motor 410. The worm gear 422 interlocked with the worm

421 rotates while changing a rotation direction thereof to a direction perpendicular to the rotational shaft 411 of the motor 410. At this time, a gear teeth 421a formed on the worm 421 and a gear teeth 422a formed on the worm gear 422 are engaged with each other, and the driving force of the motor 410 is transmitted to the worm gear 422 through the worm 421. The worm gear 422 transmits the driving force of the motor 410 to the connector 330 through the second screw thread 422b engaged with the first screw thread 331 formed on an outer circumferential surface of the connector 330. At this time, the worm gear 422 and the connector 330 may be provided with the self-locking structure.

The worm gear 422 may be elastically supported by the elastic member 130 provided in the caliper housing 100. The driving force may be transmitted to the connector 330 through the worm gear 422, and when the rotation limit unit 300 comes into close contact with or is separated from the spindle 200, a reaction force may be applied to the worm gear 422. At this time, the elastic member 130 may elastically support the worm gear 422 in a direction opposite to the reaction force applied to the worm gear 422. Therefore, it is possible to constantly maintain the position of the worm gear 422 in the caliper housing 100, and it is possible to uniformly maintain the fixed position when the rotation limit unit 300 moves forward or backward. Therefore, it is possible to uniformly maintain the positions and movement distance where the rotation limit unit 300 moves forward or backward, and it is possible to improve the reliability of the restraint of the rotation limit unit 300 with respect to the spindle 200.

In addition, the electronic brake system may be mounted on the vehicle to implement the parking brake force and secure the braking reliability.

Hereinafter, a method of operating the electronic brake system according to one embodiment of the present disclosure will be described. The electronic brake system according to one embodiment of the present disclosure may operate in a parking mode for maintaining the parking brake state of the vehicle and may be operated to release the parking mode due to the release of the parking brake of the vehicle.

First, when a driver operates a parking switch or the like for parking brake of the vehicle, the actuator 40 operates to transmit a driving force to the spindle 200. When the spindle 200 rotates, the nut 201 moves in the axial direction, and the nut 201 presses the piston 110 and thus braking is performed.

The rotation limit unit 300 is provided to come into close contact with or be separated from the spindle 200 by receiving the driving force from the drive unit 400 provided separately from the actuator 40. The drive unit 400 receives an electrical signal from the ECU or the like to generate power by the motor 410 and moves the rotation limit unit 300 through the reduction gear 420.

In the parking mode, the drive unit 400 receives the electrical signal from the ECU or the like and generates the driving force by the motor 410. The rotation limit unit 300 receives the driving force through the connector 330 interlocked with the reduction gear 420 and comes into close contact with the spindle 200. The binder 320 may come into close contact with the stepped portion 210, and the first protrusion 211 formed on the stepped portion 210 may be inserted into the first groove 321 formed in the binder 320 to limit the spindle 200, thereby preventing the parking brake of the vehicle from being released. At this time, the second protrusion 311 formed on the body 310 may be inserted into the second groove 121 to prevent the rotation limit unit 300 from rotating together with the spindle 200, thereby preventing the parking brake of the vehicle from being released.

When the parking mode is released, the rotation limit unit 300 receives the driving force through the connector 330 interlocked with the reduction gear 420 and is separated from the spindle 200. At this time, the rotational shaft 411 of the motor 410 rotates in a direction opposite to that in the parking mode. The binder 320 is separated from the stepped portion 210 so that the first protrusion 211 comes out of the first groove 321. The connected state between the rotation limit unit 300 and the spindle 200 is released, and thus the spindle 200 may rotate again. After the parking mode is released, the spindle 200 receiving the driving force from the actuator 40 rotates and moves the nut 201 rearward to release the state in which the nut 201 presses the piston 110, and thus it is possible to release the parking brake state of the vehicle. At this time, the second protrusion 311 formed on the body 310 may be released from the second groove 121.

As described above, the electronic brake system according to one embodiment of the present disclosure may limit the rotation of the spindle 200 through the rotation limit unit 300, thereby preventing the braking from being released in the parking brake state. At this time, the spindle 200 is restricted by the rotation limit unit 300, and the rotational force of the spindle 200 may be distributed to the caliper housing 100 through the supporter 120, thereby preventing the rotational force of the spindle 200 from being concentrated to the drive unit 400. In addition, since the separate drive unit 400 may be provided to bring the rotation limit unit 300 into close contact with the spindle 200 or separate the rotation limit unit 300 from the spindle 200, it is possible to decrease the current consumption without continuously applying the current in the parking mode and bring the rotation limit unit 300 into contact with the spindle 200 with a strong axial force in the parking mode.

An electronic brake system and a vehicle including the same according to one embodiment of the present disclosure can generate a braking force by a rotation limit unit that limits the rotation of a spindle.

An electronic brake system and a vehicle including the same according to one embodiment of the present disclosure can distribute a rotational force of a spindle applied to a rotation limit unit through a supporter to a caliper housing, thereby preventing the rotational force of the spindle from being concentrated to the drive unit.

An electronic brake system and a vehicle including the same according to one embodiment of the present disclosure can generate a braking force by providing an actuator configured to transmit power to a spindle and a separate drive unit and bringing a rotation limit unit into close contact with the spindle.

An electronic brake system and a vehicle including the same according to one embodiment of the present disclosure can decrease current consumption and improve braking reliability.

As described above, although the present disclosure has been described with reference to limited embodiments and drawings, it goes without saying that the present disclosure is not limited thereto, and various modifications and variations are possible by those skilled in the art to which the present disclosure pertain within the technical spirit of the present disclosure and an equivalent scope of the claims to be described below.

What is claimed is:

1. An electronic brake system comprising:
a piston provided in a caliper housing to press a pad plate;
a nut coupled to an inside of the piston to move the piston forward or backward;
a spindle configured to move the nut forward or backward by rotation and including a stepped portion formed on an outer surface thereof;
a rotation limit unit connected to or disconnected from the spindle to allow or block the rotation of the spindle; and
a drive unit configured to move the rotation limit unit to a position at which the rotation of the spindle is allowed or blocked,
wherein the rotation limit unit includes
a body surrounding an outer circumferential surface of the spindle,
a binder provided on the body to come into close contact with or be separated from the stepped portion, and
a connector provided on the body and configured to receive a driving force from the drive unit, and
wherein the connector extends from the body and moves forward and backward along with the body by the driving force,
wherein the drive unit includes a worm gear having an inner side engaged with the connector and configured to rotate so as to move the connector forward and backward.

2. The electronic brake system of claim 1, wherein any one of the stepped portion and the binder includes at least one first protrusion, and the other of the stepped portion and the binder includes a first groove connected to the first protrusion.

3. The electronic brake system of claim 2, wherein the first groove is formed to be recessed in an axial direction of the spindle.

4. The electronic brake system of claim 1, wherein the caliper housing includes a supporter surrounding an outer circumferential surface of the body.

5. The electronic brake system of claim 4, wherein
the supporter includes a second groove formed to be recessed in an axial direction of the spindle, and
the body includes a second protrusion formed to protrude from a position corresponding to the second groove.

6. An electronic brake system comprising:
a piston provided in a caliper housing to press a pad plate;
a nut configured to move the piston forward or backward;
a spindle configured to move the nut forward or backward by rotation and including a first groove formed to be recessed in an outer surface thereof;
a rotation limit unit including a first protrusion formed to protrude from a position corresponding to the first groove to allow or block the rotation of the spindle and fixedly inserted into the first groove; and
a drive unit configured to move the rotation limit unit forward or backward to a position at which the rotation of the spindle is allowed or blocked,
wherein the rotation limit unit includes a body surrounding an outer circumferential surface of the spindle and a connector connected to the drive unit and configured to receive a driving force from the drive unit, and
wherein the connector extends from the body and moves forward and backward along with the body by the driving force, wherein the drive unit includes a worm gear having an inner side engaged with the connector and configured to rotate so as to move the connector forward and backward.

7. The electronic brake system of claim 6, wherein
the spindle includes a stepped portion including the first groove and provided on an outer surface of the spindle, and
the rotation limit unit further includes
a binder including the first protrusion and provided on the body to come into close contact with or be separated from the stepped portion.

8. The electronic brake system of claim 7, wherein the first groove is formed to be recessed in an axial direction of the spindle.

9. An electronic brake system comprising:
a piston provided in a caliper housing to press a pad plate;
a nut configured to move the piston forward or backward;
a spindle configured to move the nut forward or backward by rotation and including a first groove formed to be recessed in an outer surface thereof;
a rotation limit unit including a first protrusion formed to protrude from a position corresponding to the first groove to allow or block the rotation of the spindle and fixedly inserted into the first groove; and
a drive unit configured to move the rotation limit unit forward or backward to a position at which the rotation of the spindle is allowed or blocked,
wherein the rotation limit unit includes a body surrounding an outer circumferential surface of the spindle and a connector connected to the drive unit and configured to receive a driving force from the drive unit, and
wherein the connector extends from the body and moves forward and backward along with the body by the driving force,
wherein the drive unit includes:
a motor configured to generate power; and
a reduction gear connected to a rotational shaft of the motor to transmit the driving force to the rotation limit unit, and
wherein the reduction gear includes:
a worm connected to the rotational shaft of the motor; and
a worm gear having an outer side connected to the worm and an inner side connected to the connector.

10. The electronic brake system of claim 9, wherein
the connector has a first screw thread formed on an outer circumferential surface thereof, and
the worm gear has a second screw thread engaged with the first screw thread formed at a position corresponding to the first screw thread.

11. The electronic brake system of claim 9, wherein the caliper housing includes an elastic member configured to elastically support the worm gear.

12. The electronic brake system of claim 6, wherein the nut has a hollow in a longitudinal direction and a first screw thread, which is screw-coupled to a second screw thread formed on the spindle in a certain section in the longitudinal direction, formed on an inner circumferential surface of the hollow.

13. The electronic brake system of claim 7, wherein the stepped portion is formed to extend radially from the outer circumferential surface of the spindle.

14. The electronic brake system of claim 7, wherein
the spindle includes a spindle body connected to a motor of an actuator, and the body surrounds an outer circumferential surface of the spindle body so that the spindle body passes through the body.

15. A method of operating an electronic brake system, the method comprising:

in a parking mode, transmitting, by an actuator, a first driving force to a spindle so that a nut presses a piston;

transmitting, by a drive unit, a second driving force to a rotation limit unit and bringing a binder into close contact with a stepped portion; and upon releasing the parking mode, separating the binder from the stepped portion, and releasing a state in which the nut presses the piston, wherein, in the bringing of the binder into close contact with the stepped portion, the second driving force of the drive unit is transmitted to the rotation limit unit through a connector and a worm gear of the drive unit, the connector being connected to the drive unit and moving forward and backward by the second driving force, and the worm gear having an inner side engaged with the connector and configured to rotate so as to move the connector forward and backward.

16. The method of claim 15, wherein:

in the bringing of the binder into close contact with the stepped portion, a first protrusion formed on a body is inserted into a first groove formed in the binder; and in the separating of the binder from the stepped portion, the first protrusion is released from the first groove.

17. The method of claim 15, wherein:

in the bringing of the binder into close contact with the stepped portion, a second protrusion formed on a body is inserted into a second groove formed in a supporter to prevent rotation of the body; and in the separating of the binder from the stepped portion, the second protrusion is moved in a release direction in the second groove.

* * * * *